United States Patent
Linney et al.

(10) Patent No.: US 10,264,136 B2
(45) Date of Patent: Apr. 16, 2019

(54) RESOURCE ALLOCATION IN A DIGITAL COMMUNICATION NETWORK

(71) Applicant: BRITISH TELECOMMUNICATIONS PUBLIC LIMITED COMPANY, London (GB)

(72) Inventors: Trevor P Linney, London (GB); Ian E Horsley, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 101 days.

(21) Appl. No.: 15/129,550

(22) PCT Filed: Mar. 23, 2015

(86) PCT No.: PCT/GB2015/050848
§ 371 (c)(1),
(2) Date: Sep. 27, 2016

(87) PCT Pub. No.: WO2015/150732
PCT Pub. Date: Oct. 8, 2015

(65) Prior Publication Data
US 2017/0118350 A1  Apr. 27, 2017

(30) Foreign Application Priority Data

Mar. 31, 2014 (EP) .................................... 14250059

(51) Int. Cl.
*H04M 11/06* (2006.01)
*H04B 3/32* (2006.01)
*H04L 5/14* (2006.01)

(52) U.S. Cl.
CPC ............ *H04M 11/062* (2013.01); *H04B 3/32* (2013.01); *H04L 5/14* (2013.01)

(58) Field of Classification Search
CPC ....... H04M 11/062; H04M 11/06; H04B 3/32; H04L 5/14
(Continued)

(56) References Cited

U.S. PATENT DOCUMENTS

2008/0151742 A1* 6/2008 Stolle .................... H04M 3/085
 370/201
2008/0192813 A1 8/2008 Stolle et al.
(Continued)

FOREIGN PATENT DOCUMENTS

EP    1 370 057    12/2003
WO    WO 2010/018562    2/2010

OTHER PUBLICATIONS

International Search Report for PCT/GB2015/050848, dated Jun. 18, 2015, 4 pages.
(Continued)

*Primary Examiner* — Rownak Islam
(74) *Attorney, Agent, or Firm* — Nixon & Vanderhye P.C.

(57) ABSTRACT

Methods and apparatus are disclosed for allocating resources in a Digital Subscriber Line network, the network comprising at least one lower-tier digital subscriber line carrying signals according to a first protocol between a transceiver device at a lower-tier network node and a subscriber transceiver device and further comprising at least one higher-tier digital subscriber line carrying signals according to a second protocol between a transceiver device at a higher-tier network node and a subscriber transceiver device, the first protocol permitting signals to be carried at frequencies in a range having a higher upper limit than the second protocol.

20 Claims, 3 Drawing Sheets

Physical set-up (58) Field of Classification Search
USPC .......................................................... 370/276
See application file for complete search history.

(56) References Cited

U.S. PATENT DOCUMENTS

| | | | |
|---|---|---|---|
| 2009/0086798 A1* | 4/2009 | Zukunft | .................. H04L 12/10 |
| | | | 375/222 |
| 2010/0027601 A1 | 2/2010 | Fang | |
| 2012/0275576 A1 | 11/2012 | Wei | |
| 2015/0270942 A1* | 9/2015 | Sorbara | .................. H04L 5/143 |
| | | | 370/295 |
| 2016/0366012 A1* | 12/2016 | Ginis | .................... H04L 41/083 |

OTHER PUBLICATIONS

Written Opinion of the ISA for PCT/GB2015/050848, dated Jun. 18, 2015, 6 pages.
Extended Search Report for EP 14250059.4, dated Sep. 26, 2014, 6 pages.

\* cited by examiner

PRIOR ART

Figure 1

Figure 2 - Physical set-up

Figure 3

RESOURCE ALLOCATION IN A DIGITAL COMMUNICATION NETWORK

This application is the U.S. national phase of International Application No. PCT/GB2015/050848 filed 23 Mar. 2015, which designated the U.S. and claims priority to EP Patent Application No. 14250059.4 filed 31 Mar. 2014, the entire contents of each of which are hereby incorporated by reference.

TECHNICAL FIELD

The present invention relates to resource allocation in a digital communication network, in particular a Digital Subscriber Line (DSL) network.

BACKGROUND TO THE INVENTION AND PRIOR ART

A Digital Subscriber Line (DSL) connection is a connection that allows for the provision of digital communication over existing twisted copper pair subscriber lines. The term DSL is a collective term to cover a number of variations on the DSL technology, including ADSL ("Asymmetric" DSL), SDSL ("Symmetric" DSL), ADSL2+(a technique that extends the capability of basic ADSL by doubling the number of downstream channels), VDSL (Very-high-bit-rate DSL), VDSL2 (an improved version of VDSL), and others, including, in particular, "G.fast", which will be discussed later.

In general, a DSL connection comprises a copper subscriber line extending between two DSL modems. A first DSL modem is typically located at the customer's premises, and the second modem may be located at the local exchange (known as the 'central office' in US terminology), in a street cabinet, or distribution point (DP). (NB The acronym "DP" is sometimes also used to refer to a 'drop point', and the distribution point may in fact be a drop point, but in general, where the acronym "DP" is used here, it will be used to refer to the term "distribution point", whether this is a drop point or otherwise).

Typically, the local exchange, street cabinet or distribution point includes a DSL Access Multiplexer, DSLAM (a form of aggregation transceiver device) comprising several DSL modems (one for each subscriber line). The DSLAM (at the exchange, cabinet or distribution point) connects the first DSL modem at the customer's premises to the Core Network, typically over a faster optical fibre connection, and a Network Management System (NMS).

Figure 1:
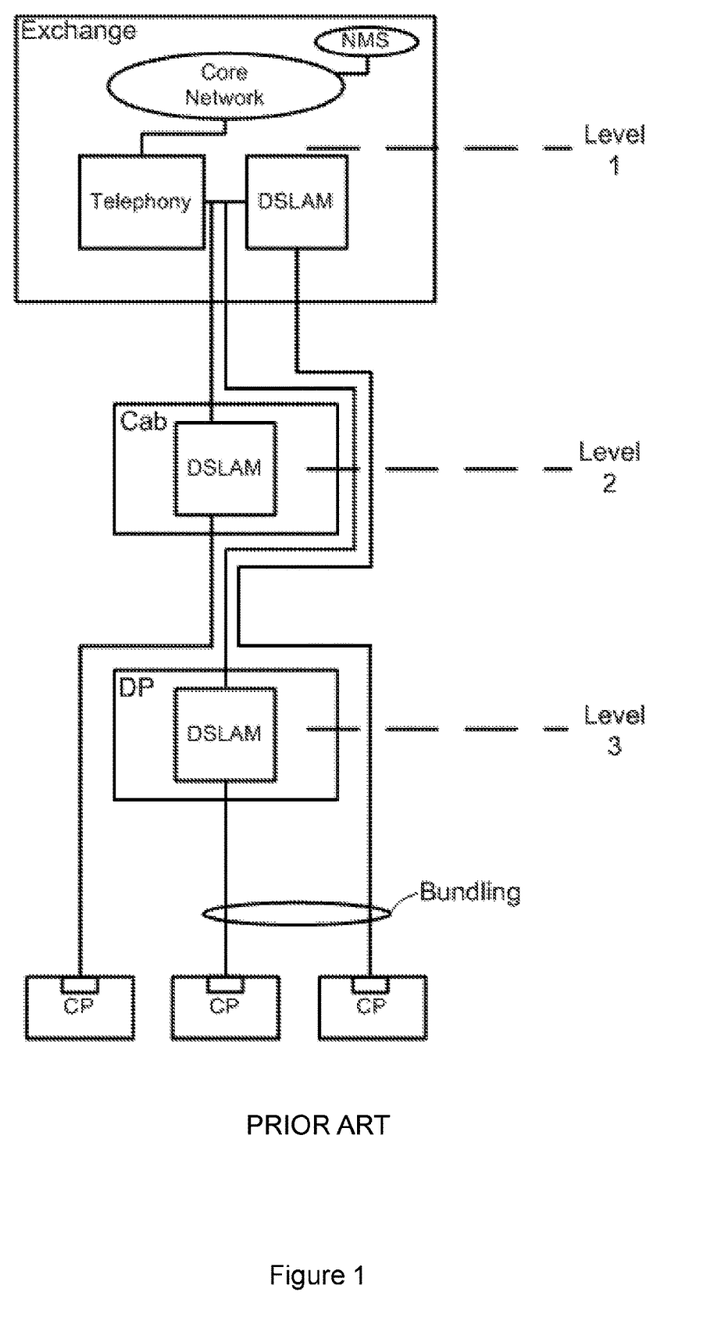
FIG. 1 is a schematic diagram of a prior art DSL network.

FIG. 1 illustrates a hierarchical relationship between the local exchange ("Exchange") (from which telephony is generally also handled), a street cabinet ("Cab"), a distribution point ("DP") and three customer premises ("CP"). In general, it should be noted that there may—and generally will—be several street cabinets and several distribution points for each exchange, and many more than three customer premises, but the entities shown in FIG. 1 are intended to illustrate this hierarchical relationship, and to illustrate different ways in which customer premises may be connected to the core network. In this example, the local exchange DSLAM can be thought of as being at Level 1 of the hierarchy and connects a first set of customers' DSL modems to a Core Network. The street cabinet DSLAM can be thought of as being at Level 2 of the hierarchy and connects a second set of customers' DSL modems to the Core Network through the exchange. The distribution point DSLAM can be thought of as being at Level 3 of the hierarchy and connects a third set of customers' DSL modems to the Core Network through the exchange. All levels of the DSL hierarchy may transmit data over the same frequency domain.

It is well-known that transmissions on one subscriber line may cause interference on another subscriber line. This is known as 'crosstalk'. Furthermore, it is common for the different sets of customers' DSL modems to be bundled together (for example, a subscriber line between one of the first set of customers' DSL modems and the local exchange may be bundled together with a subscriber line between one of the third set of customers' DSL modems and the distribution point, as shown in FIG. 1). However, subscriber lines between higher-tier DSLAMs and their customers' DSL modems tend to be significantly longer than subscriber lines for lower-tier DSLAMs, such that a signal on the longer subscriber line is significantly attenuated by the point at which it is bundled together with the subscriber lines for lower-tier DSLAMs. Thus, full power transmissions by lower-tier DSLAMs can often be the cause of high levels of crosstalk on higher-tier subscriber lines using the same frequencies.

This general problem has been addressed by a technique called the Access Network Frequency Plan (ANFP). The ANFP preserves resources for the exchange by defining the Power Spectral Density (PSD) of transmissions by lower-tier DSLAMs. For example, the PSD for the cabinet's DSLAM is generally shaped such that the power level at any frequency that may also be being used by the exchange DSLAM is reduced. This generally decreases the chance of crosstalk on the DSL connections between the exchange and the customer. This technique may also be applied to the distribution point's DSLAM (such that the PSD is shaped according to the resources being used by the street cabinet and the exchange).

In order to provide customers with higher data rates, the location of the network-side DSLAM for a particular customer's line is generally being moved closer to the customer (i.e. from the exchange towards the distribution point). Thus, copper pair connections between the local exchange and street cabinets and distribution points are being replaced with optical fibre, such that the length of the copper subscriber line (with its inherent data rate limitations) is reduced. There is therefore a trend in providing a greater number of DSLAMs in street cabinets and distribution points.

A problem with the ANFP identified by the present inventors is that while the ANFP generally reduces the chance of crosstalk on higher-tier DSL connections, it generally also reduces the capacity of lower-tier DSLAMs when there is overlap in the frequencies used both by lower and higher tier DSLAMs. As DSLAMs are located closer to customers, the ANFP technique will become increasingly more inefficient in terms of the total capacity of the network.

Prior art techniques generally involve the Network Management System at the exchange determining the resource allocations for subscriber lines offline. This is generally a manual and time-consuming process for the Network Operator in question. Once the resources have been allocated, the Network Management System generally sends an allocation message to the DSLAM in question, which then implements the resource allocation to the line or lines in question at the next retrain. Such retrains can be frustrating for end-users as they generally result in loss of service for a period of time which may be several minutes. Accordingly, the Network Operator must either wait for the line to retrain, or force a retrain on the line at an appropriate time (e.g. in the middle of the night). Either way, there is generally a significant delay before the resource allocations for all lines in the network are implemented.

It is well known that the performance of DSL technologies is directly related to the ratio of the signal to noise (the SNR) at the receiver. There are many variables that affect the SNR, including the length/loss of the circuit (i.e. the copper pair) and the noise coupled into the circuit, but with DSL technologies, crosstalk (discussed above) is one of the major sources of noise into a circuit.

Looking into this in more detail, the twisted copper pair carrying a DSL circuit for a particular customer's connection rarely exists in isolation, and is normally bundled up into a cable with many other pairs (those for other customers' connections). There will generally be crosstalk (i.e. coupling between the respective pairs in a cable), which results in some of the signal transmitted on one pair coupling into other pairs. This means that unwanted signal from other circuits transmitters is received at each receiver as noise.

Crosstalk noise causes significant bit rate reduction for DSL services. The impact is generally worst when transmitters aren't collocated; the crosstalk from close transmitters (i.e. transmitters close to the customer premises) into lines where the transmitter is further away can result in very low SNRs, and hence low or decreased bit rates.

Crosstalk cancellation technology (often referred to as "vectoring") has recently reached maturity for VDSL2. This effectively mitigates the impact of crosstalk, but only for circuits connected to the same DSLAM where the cancellation algorithms are run. "Alien" crosstalk (i.e. crosstalk from circuits connected to other DSLAMs) can remove much of the gain from vectoring.

The present inventors have realised that this may be a particular issue in relation to "G.fast" (referred to briefly earlier), which is a further DSL standard under development (in early 2014) by the ITU-T, and which relates to a DSL technology capable of enabling faster aggregate uplink and downlink data rates than are possible with VDSL2. G.fast data rates are currently expected to be up to 1 Gbit/s over existing copper telephone wires shorter than 250 m. The name "G.fast" comprises an acronym for "Fast Access to Subscriber Terminals" together with the letter "G" from the ITU-T "G series" of recommendations (ITU-T G.9700 and G.9701) concerned.

It will be noted that while G.fast is a further development of technology used in VDSL2, it is optimised for shorter distances such as those from distribution points to customer premises (i.e. up to around 250 m)—it is not intended to be used as a replacement for VDSL2 over longer distances.

In G.fast (as in VDSL2 and most ADSL variants), data is modulated using discrete multi-tone (DMT) modulation. G.fast modulates up to 12 bits per DMT frequency carrier (compared with 15 in VDSL2). Unlike ADSL2 and VDSL2, G.fast uses time-division duplexing (ADSL2 and VDSL2 use frequency-division duplexing).

To avoid the potential impact on vectored VDSL2 deployed at the cabinet from G.fast deployed at the distribution point, the initial assumption has been to use statically non-overlapped spectrum. For example, VDSL2 in the UK is limited to 17 MHz. Due to the slow roll-off of the G.fast PSD, the transmitted power only becomes insignificant 5 MHz below the lowest used frequency. As a result, G.fast may be deployed with a fixed lower frequency of 23 MHz, which sacrifices at least 200 Mb/s when compared to a lower frequency of 2 MHz. This is because in order to maintain spectral compatibility with VDSL from the cabinet (i.e. a maximum frequency of 17.667 MHz), a static method would need to start at 23 MHz. This would prevent the use of carriers between 2.2 MHz (the top of ADSL2+) and 23 MHz, with a theoretical capacity of approximately 200 Mbps.

In the UK, the ANFP aims to balance harm using static spectrum management PSDs which are selected at different locations based on loop records. This technique relies on accurate records and must be set up with the worst case assumption of few circuits, high crosstalk. It doesn't account for the actual DSL performance and which customers are enabled, but despite being conservative would recover some of the >200 Mb/s in some locations.

Other techniques involve connecting complex Dynamic Spectrum Management (DSM) systems to both the short and the long systems which operate close to real time using optimal spectrum balancing, iterative "water filling" or similar algorithms to optimise the PSDs with the aim of achieving the lowest starting frequency individually on each G.fast line. Such techniques are complex, require large quantities of data, and are difficult to implement between multiple Network Operators for commercial, practical and regulatory reasons.

It is therefore desirable to alleviate some or all of the above problems.

Referring now to specific prior art techniques and disclosures, United States patent application US2008/0192813 ("Stolle et al") relates to techniques for adjusting transmit power spectra of both subscriber devices and central transmit/receive devices of a communications network. The specification of this patent application refers to a feature called "Downstream Power Back Off" (DPBO). This uses attenuation (the electrical losses of cables) to estimate the received signal from the exchange and to set the power transmitted from a cabinet at this level so the cabinet transmissions cause no more harm than other additional exchange services would.

European patent application EP1370057 ("Alcatel") relates to techniques for the deployment of ADSL services. It suggests using records of line lengths to estimate frequencies which are likely to be being used.

US2012275576 ("Wei") relates to a downstream power back-off technique for digital subscriber lines, and in particular to a method comprising determining power spectrum density (PSD) profiles for a plurality of cabinet-deployed lines by jointly and iteratively determining cut-off frequencies based on crosstalk coupling parameters among the lines, the cut-off frequencies and PSD profiles being in one-to-one correspondence, each profile comprising a reduced PSD portion below the cut-off frequency of the profile and a maximum PSD portion above the cut-off frequency. The technique disclosed requires knowledge of the PSD transmitted by each other line together with knowledge of the crosstalk coupling factors concerned.

WO10018562 ("ECI Telecom") relates to noise mitigation in xDSL lines based on conventional downstream power back-off (DPBO), upstream power back-off (UPBO) and Virtual Noise (VN) techniques. It aims to enable dynamic, more accurate determination of parameters required for management of transmission in xDSL channels.

US2010027601 ("Fang") relates to techniques for controlling DSL transmission power, involving determining a group to which a line belongs, and selecting a representative line from each group to form a line model; obtaining a crosstalk model of the line model; obtaining Transmit Power Spectrum Density (TxPSD) of each representative line in the line model according to the crosstalk model, and converting the TxPSD into a spectrum control parameter; and enhancing the line rate according to the spectrum control parameter.

SUMMARY OF THE INVENTION

According to a first aspect of the present invention, there is provided a method of allocating resources in a Digital Subscriber Line network, the network comprising at least one lower-tier digital subscriber line carrying signals according to a first protocol between a transceiver device at a lower-tier network node and a subscriber transceiver device and further comprising at least one higher-tier digital subscriber line carrying signals according to a second protocol between a transceiver device at a higher-tier network node and a subscriber transceiver device, the first protocol permitting signals to be carried at frequencies in a range having a higher upper limit than the second protocol, the method comprising:

obtaining, at a management unit associated with the lower-tier network node, a metric indicating one or more frequencies that are being used for carrying signals on the at least one higher-tier digital subscriber line, and estimating therefrom an upper limit of a frequency range that is being used for carrying signals on the at least one higher-tier digital subscriber line;

determining, in dependence on the obtained metric, an updated power spectral density to be applied in respect of the at least one lower-tier digital subscriber line for signals to be carried between the transceiver device at the lower-tier network node and the subscriber transceiver device, the updated power spectral density having a minimum frequency that is above the upper limit of the frequency range that has been estimated as being used for carrying signals on the at least one higher-tier digital subscriber line; and then applying the updated power spectral density in respect of signals carried by the at least one lower-tier digital subscriber line.

According to preferred embodiments, the metric is indicative of one or more measurements of a dynamic characteristic of the at least one lower-tier digital subscriber line. The dynamic characteristic may be noise caused on the at least one lower-tier digital subscriber line, at least a portion of which may be caused by signals from the at least one higher-tier digital subscriber line, due to crosstalk between the respective lines which is generally due to them being bundled together for a part of their respective paths to their respective customer premises. In particular, the dynamic characteristic may be Quiet Line Noise (QLN) caused on the at least one lower-tier digital subscriber line.

According to preferred embodiments, the step of determining an updated power spectral density to be applied in respect of the at least one lower-tier digital subscriber line may comprise determining one or more frequencies or frequency-ranges to use for the at least one lower-tier digital subscriber line. Alternatively or additionally, the step of determining an updated power spectral density to be applied in respect of the at least one lower-tier digital subscriber line may comprise determining one or more frequencies or frequency-ranges not to use for the at least one lower-tier digital subscriber line. The step of determining an updated power spectral density may comprise determining a minimum frequency to use for the at least one lower-tier digital subscriber line.

According to preferred embodiments, the lower-tier network node is a distribution point. A node performing the method preferably performs measurements at the distribution-point (so may be aiming to avoid causing crosstalk problems to lines from cabinets and/or lines from an exchange which may need to use lower frequencies, and for which lower frequencies may be reserved. A node performing the method may however perform measurements at a cabinet (so may be aiming to avoid causing crosstalk problems to lines from cabinets further away or from an exchange). Other variants are also possible.

According to preferred embodiments, signals carried according to the first protocol may be carried using a Time Division Duplex based signalling system such as G.fast, while signals carried according to the second protocol may be carried using a Frequency Division Duplex based signalling system such as a version of ADSL and VDSL.

Preferably, the method is performed at or on behalf of a lower-tier node that is using a higher-frequency DSL technology (e.g. G.Fast) than the DSL technology or technologies (e.g. ADSL, VDSL) being used by the higher-tier (and generally "further away") node or nodes from which the (generally longer) higher-tier digital subscriber line or lines originate. The determination may be performed at the lower-tier node (e.g. by a management unit located at a distribution point, for example), or elsewhere, on behalf of the lower-tier node.

According to preferred embodiments, the at least one lower-tier digital subscriber line and the at least one higher-tier digital subscriber line are lines that are routed in close proximity to one another for at least a portion of a path between the lower-tier network node and the respective subscriber transceiver devices.

According to a second aspect of the present invention, there is provided apparatus for allocating resources in a Digital Subscriber Line network, the network comprising at least one lower-tier digital subscriber line carrying signals according to a first protocol between a transceiver device at a lower-tier network node and a subscriber transceiver device and further comprising at least one higher-tier digital subscriber line carrying signals according to a second protocol between a transceiver device at a higher-tier network node and a subscriber transceiver device, the first protocol permitting signals to be carried at frequencies in a range having a higher upper limit than the second protocol, the apparatus comprising a management unit operable to perform steps according to any of the preceding claims.

The various options and preferred embodiments referred to above in relation to the first aspect are also applicable in relation to the second aspect.

In particular where a high frequency bandwidth technology is deployed from nodes closer to the customer than an existing lower (but overlapping) frequency technology that is deployed from nodes further away from the customer, preferred embodiments of the invention use noise measurements or measurements of other characteristics made at the second (i.e. closer) deployment point (or other methods) in order to determine what frequencies are actually in use for the "longer" technology, then use those measurements to configure the frequencies to be used for the "shorter" technology (generally by setting a minimum frequency) such as lo avoid crosstalk interference between the respective longer and shorter lines. This may allow for a greater bandwidth to be used for the "shorter" technology (thereby allowing for higher data rates to be used for the customers in question) while avoiding unacceptable overlap with the frequencies actually being used for services using the "longer technology". This can lead to a more efficient use of the available resources than is possible under an arrangement such as the ANFP, and can be achieved with a relatively low complexity algorithm.

In relation to situations where the shorter technology is G.fast and the longer technology is VDSL or ADSL, preferred embodiments may allow for higher bit rates at some locations for G.fast customers when compared with techniques that use fixed lower frequencies.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods and apparatus for performing a resource allocation process according to a preferred embodiment will be described.

Figure 2:
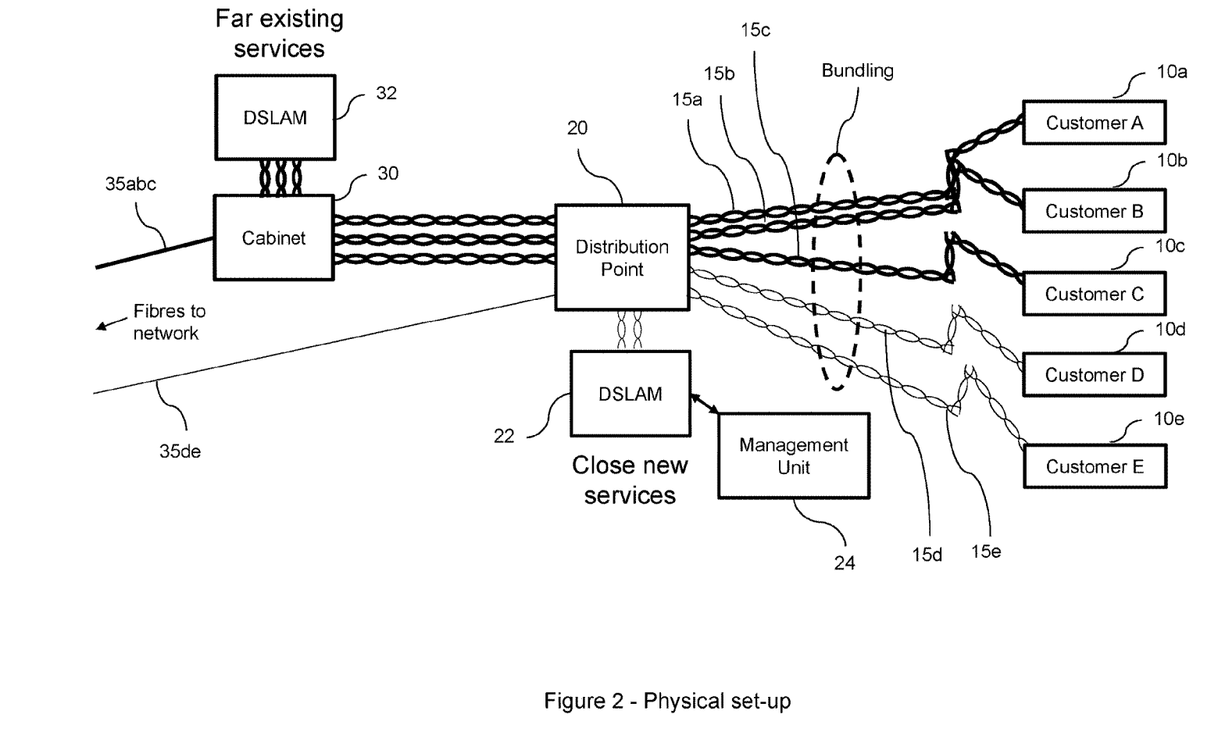
FIG. 2 shows a physical network set-up in which customers receive communications services via respective copper-pair lines.

Briefly, FIG. 2 shows a physical network set-up in which customers (generally, 10) receive communications services via respective copper-pair lines 15. These services are provided via two different nodes, which in this example are shown as a distribution point 20 (located relatively near to the customers 10) and a street cabinet 30 (located further away from the customers 10). These nodes are in communication (via respective fibre connections 35) with the Core Network via an Exchange (not shown).

Of the five customers shown, two customers, shown as Customer D (10d) and Customer E (10e), are shown as receiving their communications services via a new, close (i.e. short-range), high-frequency (and generally faster) service such as G.fast, while three other customers, Customer A (10a), Customer B (10b) and Customer C (10c) receive their communications services via an older, longer-range DSL service such as VDSL2.

It will be understood that the physical set-up shown in FIG. 2 is merely to illustrate, by way of example, a scenario in relation to which a preferred embodiment of the invention may be applicable. The respective lines need not be providing communications services for the respective customers via different DSL technologies—the respective lines may be using the same DSL technology (e.g. all using ADSL, all using VDSL, or all using G.fast), albeit with DSLAMs located at different nodes. Further, the nodes at which the respective DSLAMs for different lines are located need not be a distribution point and a street cabinet (as shown in FIG. 2)—they may be an Exchange and a distribution point, or an Exchange and a street cabinet, for example. Further, the nodes at which the respective DSLAMs for different lines are located need not be different types of node (such as the distribution point 20 and the street cabinet 30 shown in FIG. 2)—they may for example be distribution points or street cabinets at different locations, or at the same location but at different distances from the respective customer premises. Finally, it will be appreciated that while the scenario illustrated by FIG. 2 is one in which lines of different lengths may be bundled together or otherwise run next to or near enough to each other for crosstalk to be a significant issue that may in particular affect signals on the longer lines, crosstalk may also be a significant issue in relation to scenarios in which there is no significant disparity between the lengths of the respective copper pairs—signals on longer lines may, if of sufficient power, cause significant and problematic crosstalk to signals on shorter lines, with disparities in power between the respective lines becoming a more significant factor in determining which lines may be likely to cause significant and problematic crosstalk issues to which other lines. Embodiments of the invention may thus be applicable in relation to scenarios in which the respective lines are of similar or of different lengths.

Returning to the scenario of FIG. 2, Customers A, B and C (10a, 10b, 10c) are shown as having respective "long twisted pair" copper subscriber lines 15a, 15b, 15c (illustrated by thick twisted lines) which run between their respective customer premises (specifically, respective customer premises DSL modems (not shown)) and a DSLAM 32 at a street cabinet 30, from which fibre 35abc connects onward from the street cabinet 30 to the Core Network (not shown), generally via an Exchange or "Central Office" (not shown).

Customers D and E (10d, 10e) have respective "short twisted pair" copper subscriber lines 15d, 15e (illustrated by thin twisted lines to distinguish them from lines 15a, 15b, 15c) which run between their respective customer premises and a DSLAM 22 at a distribution point 20, from which fibre 35de connects onward from the distribution point 20 to the Core Network, again generally via the Exchange.

While twisted pairs 15a, 15b, 15c connecting Customers A, B and C to the DSLAM 32 at street cabinet 30 may physically pass through the distribution point 20 (as indicated in FIG. 2), it will be understood that signals they carry are not (generally) processed at the distribution point 20—the respective twisted pairs 15a, 15b, 15c carry signals directly between the respective customer premises modems and the street cabinet DSLAM 32, generally without any change of format, change of protocol, or any active processing by or at the distribution point 20.

At the distribution point 20, as well as the distribution point DSLAM 22, there is a management unit 24. This may perform various management functions as set out in Recommendation ITU-T G.997.1: "Physical layer management for digital subscriber line transceivers", which typically include configuration of the lines, configuration of "layer 2" functionality and performance reporting. For the purposes of the present embodiment, it is located at the distribution point 20 in particular because the distribution point 20 is a node at one end of one or more "shorter" twisted pairs (i.e. copper subscriber lines 15d and 15e) which run between it and respective "shorter service" (e.g. G.fast) customers (i.e. Customers D and E), which twisted pairs (15d, 15e) may be bundled together with or near one or more "longer" twisted pairs (i.e. copper subscriber lines 15a, 15b and 15c) which run between it and respective "longer service" (e.g. VDSL or ADSL) customers (i.e. Customers A, B and C). It will be noted that the "longer" twisted pairs (i.e. lines 15a, 15b and 15c) themselves each originate from a node further away from their subscribers (i.e. at the street cabinet 30, or possibly at the Exchange). It will be understood that the entity (e.g. the network operator or be Communication Provider (CP) responsible for the operation of the DSLAM 22 and management unit 24 at the distribution point 20) generally has some control over the frequency or frequencies to use for the line(s) originating from the distribution point 20, but this may be coupled with a responsibility to select frequencies and power levels that do not interfere significantly with those longer lines passing through the distribution point 20 that originate from a more distant node. Such a responsibility may be underpinned by obligations under a static PSD rule set (i.e. in the UK, this may be the ANFP, at least in respect of the allocation of resources at street cabinets) not to use frequencies below a certain level, or in a particular range, but static PSD rule sets such as the ANFP merely set static rules that do not take into account actual conditions, and the frequencies that are actually being used by longer lines from a more distant node that then pass through a node nearer to the customers served by those lines.

Due to disparities in length between twisted pairs that may be bundled together for a significant part of the "final leg" of the communications link (i.e. the leg on the customer-side of the distribution point 20), and the likely resulting disparity in power between the signals carried by the respective "shorter" and "longer" twisted pairs (due to the disparity in the attenuation of signals carried by the respective shorter and longer twisted pairs), it is important for frequencies to be chosen for the "shorter" twisted pairs that will not interfere with those being used (or likely to be used) for the "longer" twisted pairs, but simply complying with rules such as those set under a plan such as the ANFP may be over-cautious, in that it may prevent lines from a nearer node from using frequencies that are generally reserved for longer lines, but which those longer lines are not actually using or likely to use.

In view of the above, the particular function that the management unit 24 is able to perform due to its location at the nearer of the two nodes concerned (i.e. at the distribution point 20) can be summarised briefly as follows:

It is able to measure an actual, real-time (or near real-time), dynamic, in-use characteristic of one or more of the shorter lines (i.e. shorter copper pairs) that is indicative of and allows a determination to be made of frequencies (or possibly one or more frequency-ranges) that are actually being used (or may actually be used) for those longer lines (i.e. longer copper pairs);

It is then able to identify frequencies (or possibly a minimum frequency, or one or more frequency-ranges) that can safely be used for one or more shorter lines originating from itself, based on the determinations made in respect of the longer lines; and then It is then able to use those identified frequencies (or the identified frequency-range(s), or frequencies above the identified minimum frequency) for services to be provided on the shorter lines, having confirmed that the provision of such services will not cause interference (and hence unacceptable levels of crosstalk) to services being provided on the longer lines.

The present embodiment will be described in the context of a scenario in which longer lines carrying VDSL signals from an exchange or a street cabinet 30 to customers 10a, 10b and 10c pass through (or near) a distribution point 20 from which shorter lines carry signals according to a G.fast service to customers 10d and 10e, and in which VDSL lines 15a, 15b and 15c are therefore bundled together with G.fast lines 15d and 15e for a part of the "final leg" before branching off to the premises of the individual customers.

In the present embodiment, it is proposed to use Quiet Line Noise (QLN) as the characteristic indicative of frequencies being used for the longer lines. Measurements of QLN show the levels of noise on a line when a DSL connection is inactive, and can provide a wideband spectral analysis function. QLN is one of the diagnostic characteristics in respect of which ADSL2, ADSL2+ and VDSL standard-compliant DSLAMs or transceivers are required to collect and present data in their Management Information Base (MIB), along with data in respect of channel characteristics and signal-to-noise ratios.

QLN can be measured using the shorter lines 15d and 15e, which may pick up signals from the longer lines as crosstalk. (As an alternative, it is possible that QLN may be measured by a dedicated line, essentially acting as a QLN sensor.)

In the present embodiment, the management unit 24 at the distribution point 20 therefore collects data including QLN data in respect of the shorter lines 15d, 15e originating from the distribution point 20. In this case this is a vector index on tone group showing the noise power on each tone at "train-up". The management unit 24 also collects the "SNR_per_tone" (signal-to-noise ratio per-tone) data.

With reference to ITU-T G.997.1 (referred to earlier), QLN and SNR_per_tone data are both generally in the form of vectors, with one value per tone or group of tones (the group often having four tones). A tone is typical 4.3215 kHz wide for VDSL2. It will be understood that the process could be carried out on single tones or on groups of tones, however.

Briefly, using the collected line data, the management unit 24 can configure the frequencies to be used for the shorter lines (i.e. in this case, for G.fast services to be provided via lines 15d and 15e), generally by setting a minimum frequency to be used for the G.fast services.

An exemplary process for performing the above will now be described with reference to FIG. 3.

It will be understood that line data, which may include QLN data, SNR data and data relating to other line characteristics, is generally made available for analysis on an ongoing basis throughout the day, generally every 15 minutes (relating to a recent 15-minute period), and may therefore be monitored on an ongoing basis (perhaps performing an analysis routine every 15 minutes in respect of newly-received line data), but it is generally not necessary and may be inappropriate to make changes to the frequencies being used for lines (or make other such updates to line profiles) so often. The process illustrated by FIG. 3 is set up in order to analyse data on an ongoing basis, but only to update line profiles if it has been at least 24 hours since the previous update—other techniques may of course be used if it is desired or appropriate to avoid updates to lines profiles being made too frequently. A process similar to that of FIG. 3 may simply be run once a day, or with some other periodicity, or may be triggered by an event or measurement indicating that profile updates may be necessary or appropriate.

Figure 3:
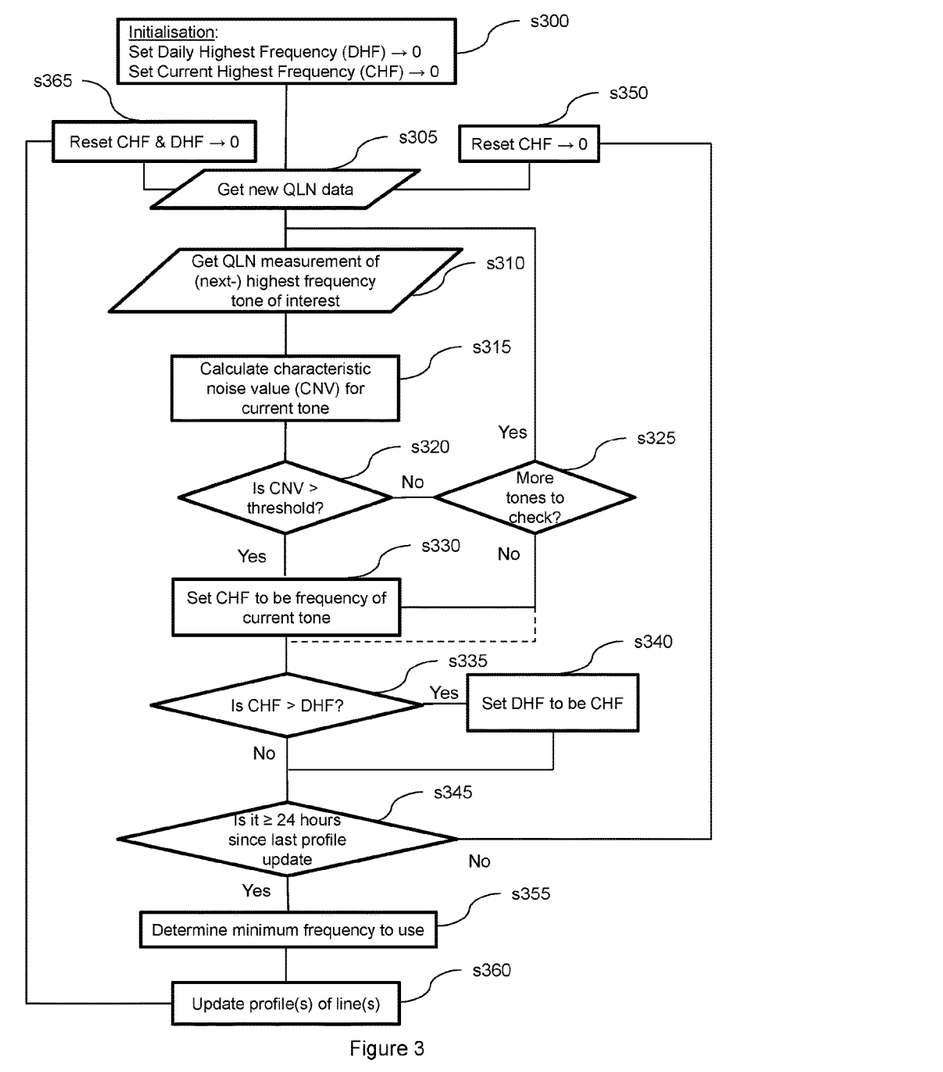
FIG. 3 is a flow-chart illustrating a method of allocating resources in a DSL network according to a preferred embodiment.

Referring to FIG. 3, this has an "Initialisation" step s300, in which two variables, referred to as the "Daily Highest Frequency" (DHF) and the "Current Highest Frequency" (CHF) are both set to a default value, in this instance zero. (NB It should be noted that these initial settings for CHF and DHF may result in a finding that there is no lower limit to the frequencies that are safe to use for the shorter lines, if the QLN data in respect of the shorter lines is indicative of there being no crosstalk at any frequencies between the longer and shorter lines, for example. To avoid this possibility, an alternative is to set either or both of CHF and DHF at a level corresponding to a frequency estimated to be very likely to be in use for the longer lines, on the basis that it would be unsafe to use frequencies that low for the shorter lines even if the current QLN data indicates that such frequencies are not currently in use for the longer lines.)

At step s305, the management unit 24 receives a new batch of line data (this may happen every 15 minutes, for example) including QLN data—and possibly data relating to other characteristics such as and SNR_per_tone data—in respect of the lines (lines 15d and 15e, and possibly several more) between it and the customers in question (customers 10d and 10e, and possibly several more).

The loop containing steps s310 to s340 aim to identify what frequencies—within a range of possible overlap between those potentially being used by the long lines 10a, 10b, 10c, etc. and those desired to be used by the short lines 10d, 10e, etc.—are not actually being used by the long lines 10a, 10b, 10c, etc. This generally involves identifying the lowest frequency of those desired to be used for the short lines 10d, 10e, etc. that is sufficiently above those actually being used by the long lines 10a, 10b, 10c, etc. as to cause insignificant or no cross-talk between the lines.

At step s310, initially, the QLN measurement in respect of the highest-frequency tone of interest is considered. (NB For efficiency, tones of frequencies above the range that may be used for the longer lines may be ignored, as tones above that range should not fall within the overlap anyway.)

At step s315, a characteristic noise value (CNV) for the current tone is calculated. This may involve applying a minimum based smoothing filter to remove the impact of broadcast carriers and "Repetitive Electrical Impulse Noise" (REIN) (i.e. interference such as that which may be caused by faulty electrical equipment in the proximity of the line emitting a radio-frequency signal, and which may cause electrical impulses/spikes on the line). Further, noise may come from many sources, including the DSLAM and modem for the current lines, which have a noise floor. There may also be fixed and known background noise sources that affect all lines. The calculation of the CNV may also involve, for each line, calculation of a noise floor based on the DSLAM and modem type and possibly the location. It may thus be appropriate to incorporate this as a vector ("Noise_Floor") the same size as the QLN and SNR vectors, and use a function such as the following to compute the noise level above the noise floor, remove any negatives:

Noise_Level=Max(QLN_current−Noise_Floor,0)

At step s320, the CNV for the tone currently under consideration is compared with a threshold, the threshold being at a level corresponding to an amount of noise that may be indicative of possible problematic crosstalk at the frequency concerned. If the CNV of the current tone is above the threshold, the CHF value is set to be the frequency of the tone currently being considered (step s 330), and the process continues to step s335.

If the current CNV is not above the threshold but there are more (i.e. lower-frequency) tones to be considered (step s325), the process returns to steps s310, and the QLN measurement in respect of the next-highest-frequency tone is considered in a similar manner. If all tones have been considered, the process continues (via s330) to step s335. (NB With reference to the alternative set out earlier in which CHF and DHF are initialised to values other than zero, which are estimated as being "potentially at the limit of or above the range currently being used for the longer lines", it should be noted that it may, in some instances, be appropriate to proceed via the dotted line directly to step s335, rather than proceed via step s330.)

Unless no tones have been found for which the CNV was above the threshold, the CHF will correspond to the frequency of the first tone (i.e. the highest-frequency tone of interest) for which the CNV was found to be above the threshold. The process could continue directly to the stage of updating the frequencies to be used by DSLAM 22 for the short lines, but as indicated earlier, it is generally inappropriate for such updates to be made too frequently, so the process continues via steps s335 to s350, which aim to identify the highest level reached by the CHF during the course of a 24-hour period after a previous profile update.

The first time step s335 is reached, a newly-found CHF value will be greater than the DHF value (which will have been initialised to its default value of zero), so the DHF will be set to the CHF (step s340). As long as a 24-hour period has not passed since the previous profile update (step s345), the process then continues via step s350 (in which the CHF value is reset to zero) back to step s305, and the process from step s305 to s345 is repeated with any newly-received QLN data (s305). If this data leads to a new CHF value being found which is higher than any previously found since the previous update, the new CHF value will replace the previous highest CHF value as the DHF value, and the process of steps s305 to s350 may repeat with new sets of QLN data until such time as it is found (step s345) that it is 24 hours since the last profile update. The process then proceeds to step s355, at which a minimum "safe" frequency to use for the short lines can be determined based on the DHF value. It is generally appropriate to have a frequency buffer zone between the ranges used for the long and short lines, in particular to avoid the slow roll-off of the transmit power over frequency for the short lines from harming the service provided on the long lines, e.g.

Minimum_Frequency=Max_Frequency+buffer i.e. buffer=6 MHz (5 MHz for fast roll-off, plus a safety-zone of 1 MHz)

The profiles of the short lines may then be updated in accordance with the newly-determined minimum safe frequency (step s360).

The process then continues via step s365 (in which the CHF and DHF values are both reset to zero) back to step s305, and the process from step s305 to s355 may be repeated with newly-received QLN data (s305).

It will be evident that individual steps within the process of FIG. 3 may be performed in a variety of ways. It will also be evident that processes other than that of FIG. 3 may be performed in order to obtain the same or similar determination in respect of what frequency or frequencies may be used for services on the shorter lines without causing unacceptable crosstalk interference between the respective longer and shorter lines. Various options will be briefly discussed below.

Estimation of Current QLN

QLN is generally calculated at train-up. SNR_per_tone is calculated regularly. The SNR_per_tone may be obtained from the last retrain (possibly by sampling QLN and Hlog regularly, or possibly using an alarm process on a retrain to trigger collection of SNR_per_tone data), i.e.

current_QLN=QLN+current_SNR_per_tone−first_SNR_per_tone, where first_SNR_per_tone is the SNR_per_tone related to the QLN measurement.

Alternative to Adjusting Frequencies to be Used

While it is generally appropriate to adjust the frequencies to be used for the lines from the respective "shorter technology" nodes in response to a finding that the frequencies currently being used are overlapping with those currently being used for "longer technology" lines, it may be appropriate instead to adjust the PSD, while continuing to use those frequencies.

Alternatives to Using QLN Data

While QLN data in respect of the short lines from a particular node can provide a good indication to a management unit at that node of frequencies that are being used for services on longer lines that may be bundled with those short lines, other characteristics that can be measured using the short lines or dedicated sensors may be used instead of or as well as QLN data. Noise data other than QLN data may be used, particularly if QLN data is not available, or is not immediately available. Further, dynamic data indicative of frequencies actually being used or intended to be used for the longer lines may be shared by the entities running those lines, or by the nodes from which they are running, which may send such data to the entity running the shorter lines or to the respective "shorter technology" nodes on an ongoing basis. Such data may be used instead of or as well as data measured by or on behalf of the management unit at the "shorter technology" nodes.

Reducing Frequency of Retrains

While there may be situations in which it may be appropriate to trigger a re-train of the shorter (e.g. G.fast) lines in order to stop using a particular frequency immediately (e.g. if the SNR of a tone being used by the shorter line changes suddenly, this could be caused by crosstalk from a longer line using that frequency, indicating that the shorter line should stop using the frequency as soon as possible), it is generally better to avoid unnecessarily frequent re-trains because they may be detrimental to the performance of the line from the point of view of the customer. A rule such as the following may be used, for example:

If the maximum frequency found to be being used by any of the longer (e.g. VDSL2) lines increases by more than a predetermined amount (A MHz) then trigger a retrain to allow a newly-determined minimum frequency to be applied immediately in respect of the shorter (e.g. G.fast) lines.

Otherwise apply the minimum frequency during a period of inactivity (e.g. overnight, based on historic usage data, or based on current usage indications).

Additional Safety

A more cautious approach may be to estimate the minimum safe frequency for each line at the lower-tier node (e.g. at the distribution point 20), and then to apply the maximum of these frequencies to all lines from that node. This approach may be prudent, because different shorter lines may be coupled with different longer lines.

Reducing Rate Fluctuations

To reduce the fluctuation of minimum frequency of and hence required retrains and fluctuation in bit rate, it is possible to apply the maximum (or $x^{th}$ percentile) of the minimum frequencies estimated over a period of a number of days.

Other Options for Maximum Frequency in Use Estimation

If QLN/SNR_per_Tone data isn't available or can't be processed for some reason, routing records may be used to identify which longer (e.g. VDSL2) services pass through a particular distribution point. For each of those services, the bit allocation table may be collected and used to find out the maximum used frequency.

The invention claimed is:

1. A method of allocating resources in a Digital Subscriber Line network, the network comprising at least one lower-tier digital subscriber line carrying signals according to a first protocol between a transceiver device at a lower-tier network node and a subscriber transceiver device and further comprising at least one higher-tier digital subscriber line carrying signals according to a second protocol between a transceiver device at a higher-tier network node and another subscriber transceiver device, the first protocol permitting signals to be carried at frequencies in a range having a higher upper limit than the second protocol, the method comprising:

obtaining, at a management unit associated with the lower-tier network node, a metric indicating one or more frequencies that are actually being used for carrying the signals on the at least one higher-tier digital subscriber line, and estimating therefrom an upper limit of a frequency range that is being used for carrying the signals on the at least one higher-tier digital subscriber line;

determining, in dependence on the obtained metric, an updated power spectral density to be applied in respect of the at least one lower-tier digital subscriber line for the signals to be carried between the transceiver device at the lower-tier network node and the subscriber transceiver device, the updated power spectral density having a minimum safe frequency that is above the upper limit of the frequency range that has been estimated as actually being used for carrying the signals on the at least one higher-tier digital subscriber line, wherein the range of frequencies used for the at least one lower-tier digital subscriber line using the first protocol does not have a damaging effect on the signals to be carried on the at least one higher-tier digital subscriber line using the second protocol; and then applying the updated power spectral density in respect of the signals carried by the at least one lower-tier digital subscriber line.

2. A method according to claim 1 wherein said metric is indicative of one or more measurements of a dynamic characteristic of the at least one lower-tier digital subscriber line.

3. A method according to claim 2 wherein the dynamic characteristic of the at least one lower-tier digital subscriber line is noise caused on the at least one lower-tier digital subscriber line.

4. A method according to claim 3 wherein the dynamic characteristic of the at least one lower-tier digital subscriber line is Quiet Line Noise caused on the at least one lower-tier digital subscriber line.

5. A method according to claim 1 wherein determining the updated power spectral density to be applied in respect of the at least one lower-tier digital subscriber line comprises determining one or more frequencies or frequency-ranges to use for the at least one lower-tier digital subscriber line.

6. A method according to claim 1 wherein determining the updated power spectral density to be applied in respect of the at least one lower-tier digital subscriber line comprises determining one or more frequencies or frequency-ranges not to use for the at least one lower-tier digital subscriber line.

7. A method according to claim 1 wherein the lower-tier network node is a distribution point.

8. A method according to claim 1 wherein the signals carried according to the first protocol are carried using a Time Division Duplex based signaling system.

9. A method according to claim 1 wherein the signals carried according to the second protocol are carried using a Frequency Division Duplex based signaling system.

10. A method according to claim 1 wherein the at least one lower-tier digital subscriber line and the at least one higher-tier digital subscriber line are routed in close proximity to one another for at least a portion of a path between the lower-tier network node and the respective subscriber transceiver devices.

11. A method according to claim 1 wherein the at least one lower-tier digital subscriber line and the at least one higher-tier digital subscriber line are bundled together for at least a portion of a path between the lower-tier network node and the respective subscriber transceiver devices.

12. Apparatus for allocating resources in a Digital Subscriber Line network, the network comprising at least one lower-tier digital subscriber line carrying signals according to a first protocol between a transceiver device at a lower-tier network node and a subscriber transceiver device and further comprising at least one higher-tier digital subscriber line carrying signals according to a second protocol between a transceiver device at a higher-tier network node and another subscriber transceiver device, the first protocol permitting signals to be carried at frequencies in a range having a higher upper limit than the second protocol, the apparatus comprising (i) a storage memory for storing instructions and (ii) at least one processor for executing the instructions such that the apparatus is configured to:

obtain, at the at least one processor associated with the lower-tier network node, a metric indicating one or more frequencies that are actually being used for carrying the signals on the at least one higher-tier digital subscriber line, and estimate therefrom an upper limit of a frequency range that is being used for carrying the signals on the at least one higher-tier digital subscriber line;

determine, in dependence on the obtained metric, an updated power spectral density to be applied in respect of the at least one lower-tier digital subscriber line for the signals to be carried between the transceiver device at the lower-tier network node and the subscriber transceiver device, the updated power spectral density having a minimum safe frequency that is above the upper limit of the frequency range that has been estimated as actually being used for carrying the signals on the at least one higher-tier digital subscriber line, wherein the range of frequencies used for the at least one lower-tier digital subscriber line using the first protocol does not have a damaging effect on the signals to be carried on the at least one higher-tier digital subscriber line using the second protocol; and then apply the updated power spectral density in respect of the signals carried by the at least one lower-tier digital subscriber line.

13. The apparatus according to claim 12 wherein said metric is indicative of one or more measurements of a dynamic characteristic of the at least one lower-tier digital subscriber line.

14. The apparatus according to claim 12 wherein the dynamic characteristic of the at least one lower-tier digital subscriber line is noise caused on the at least one lower-tier digital subscriber line.

15. The apparatus according to claim 12 wherein determination of the updated power spectral density to be applied in respect of the at least one lower-tier digital subscriber line comprises determination of one or more frequencies or frequency-ranges to use for the at least one lower-tier digital subscriber line.

16. The apparatus according to claim 12 wherein determination of the updated power spectral density to be applied in respect of the at least one lower-tier digital subscriber line comprises determination of one or more frequencies or frequency-ranges not to use for the at least one lower-tier digital subscriber line.

17. The apparatus according to claim 12 wherein the signals carried according to the first protocol are carried using a Time Division Duplex based signaling system.

18. The apparatus according to claim 12 wherein the signals carried according to the second protocol are carried using a Frequency Division Duplex based signaling system.

19. The apparatus according to claim 12 wherein the at least one lower-tier digital subscriber line and the at least one higher-tier digital subscriber line are routed in close proximity to one another for at least a portion of a path between the lower-tier network node and the respective subscriber transceiver devices.

20. The apparatus according to claim 12 wherein the at least one lower-tier digital subscriber line and the at least one higher-tier digital subscriber line are bundled together for at least a portion of a path between the lower-tier network node and the respective subscriber transceiver devices.

* * * * *